(12) United States Patent
Tran et al.

(10) Patent No.: US 11,993,060 B2
(45) Date of Patent: May 28, 2024

(54) MULTILAYER FILM

(71) Applicant: BOREALIS AG, Vienna (AT)

(72) Inventors: Tuan Anh Tran, Linz (AT); Gerhard Schuster, Linz (AT)

(73) Assignee: BOREALIS AG, Vienna (AT)

( * ) Notice: Subject to any disclaimer, the term of this patent is extended or adjusted under 35 U.S.C. 154(b) by 392 days.

(21) Appl. No.: 17/418,377

(22) PCT Filed: Dec. 23, 2019

(86) PCT No.: PCT/EP2019/086918
§ 371 (c)(1),
(2) Date: Jun. 25, 2021

(87) PCT Pub. No.: WO2020/136166
PCT Pub. Date: Jul. 2, 2020

(65) Prior Publication Data
US 2022/0063253 A1    Mar. 3, 2022

(30) Foreign Application Priority Data

Dec. 28, 2018 (EP) .................................. 18248113

(51) Int. Cl.
| | |
|---|---|
| B32B 27/08 | (2006.01) |
| B32B 1/00 | (2024.01) |
| B32B 7/02 | (2019.01) |
| B32B 27/32 | (2006.01) |
| B65D 65/40 | (2006.01) |
| C08J 5/18 | (2006.01) |
| C08L 23/08 | (2006.01) |

(52) U.S. Cl.
CPC .............. *B32B 27/08* (2013.01); *B32B 1/00* (2013.01); *B32B 7/02* (2013.01); *B32B 27/32* (2013.01); *B65D 65/40* (2013.01); *C08J 5/18* (2013.01); *C08L 23/0815* (2013.01); *B32B 2250/03* (2013.01); *B32B 2250/242* (2013.01); *B32B 2250/40* (2013.01); *B32B 2270/00* (2013.01); *B32B 2307/558* (2013.01); *B32B 2307/5825* (2013.01); *B32B 2307/72* (2013.01); *B32B 2307/732* (2013.01); *B32B 2439/06* (2013.01); *C08J 2323/08* (2013.01); *C08J 2423/06* (2013.01); *C08J 2423/08* (2013.01); *C08L 2203/16* (2013.01); *C08L 2205/025* (2013.01); *C08L 2205/03* (2013.01)

(58) Field of Classification Search
CPC .......... C08L 2205/025; C08L 2205/03; C08L 23/08; C08L 2203/16; B32B 2250/03; B32B 2250/04; B32B 2250/05; B32B 2250/242; B32B 2250/40; B32B 27/08; B32B 27/0815; B32B 2270/00; B32B 2307/558; B32B 2307/581; B32B 2307/5825; B32B 2307/72; B32B 2307/732; B32B 2439/09; C08J 5/18; C08J 2323/08; C08J 2423/06; C08J 2423/08; C08F 210/02
USPC ................................................ 428/35.7, 34.3
See application file for complete search history.

(56) References Cited

U.S. PATENT DOCUMENTS

| | | | | |
|---|---|---|---|---|
| 2008/0057238 A1* | 3/2008 | Follestad | ................ | B32B 27/32 |
| | | | | 427/407.1 |
| 2013/0167486 A1* | 7/2013 | Aarnio | ...................... | B65B 5/02 |
| | | | | 428/218 |
| 2015/0068943 A1* | 3/2015 | Niedersuess | ............ | B65B 11/00 |
| | | | | 53/442 |
| 2015/0251388 A1* | 9/2015 | Niedersuess | .............. | B65B 9/06 |
| | | | | 428/220 |
| 2016/0271917 A1* | 9/2016 | Nummila-Pakarinen | .................... | |
| | | | | B29C 48/0018 |
| 2016/0299158 A1* | 10/2016 | Poher | ................. | G01N 15/1434 |
| 2017/0043561 A1* | 2/2017 | Rong | ........................ | B32B 7/04 |

FOREIGN PATENT DOCUMENTS

| | | | | |
|---|---|---|---|---|
| EP | 1108749 | | 6/2001 | |
| EP | 2415598 | | 2/2012 | |
| EP | 3101060 A1 * | 12/2016 | ................ | C08J 5/18 |
| WO | 2006/037603 | | 4/2006 | |
| WO | 2008/074493 | | 6/2008 | |
| WO | 2008/104371 | | 9/2008 | |
| WO | WO-2008104371 A2 * | 9/2008 | ............ | B32B 27/32 |
| WO | 2016/135213 A1 | | 2/2016 | |
| WO | 20170055174 | | 4/2017 | |

OTHER PUBLICATIONS

International Search Report and Written Opinion for PCT/EP2019/086918 dated Jan. 16, 2020.

* cited by examiner

*Primary Examiner* — Lee E Sanderson
(74) *Attorney, Agent, or Firm* — Thomas | Horstemeyer, LLP

(57) ABSTRACT

Multilayer film which comprises a core layer (C) and two outer layers (0-1, 0-2) sandwiching the core layer, wherein (i) the core layer (C) comprises 90 to 100% by weight of a first bimodal ethylene/1-butene/$C_6$-$C_{12}$-alpha-olefin terpolymer having a density between >925 kg/m$^3$ and 970 kg/m$^3$ with respect to the total weight of the layer, (ii) two outer layers (0-1) and (0-2) comprise (ii-1) the bimodal terpolymer as defined for the core layer (C) and (ii-2) a second bimodal ethylene/1-butene/$C_6$-$C_{12}$-alpha-olefin terpolymer having a density between >910 kg/m$^3$ and <925 kg/m$^3$.

20 Claims, No Drawings

MULTILAYER FILM

FIELD OF THE INVENTION

The present invention is related to a multilayer film with excellent mechanical properties, especially stiffness and toughness, as well as processability, suitable for packaging which may be prepared by co-extrusion processes.

DESCRIPTION OF PRIOR ART

Several types of films are used today. Mono-films, mainly blends of e.g. ethylene vinyl acetate (EVA) or low density polyethylene (LDPE) with linear low density polyethylene (LLDPE), still dominate in volume sold to this market. Co-extruded films, in particular 3- or more—layer films, with tailor-made combinations deliver functional properties, down-gauging and mechanical flexibility and are increasingly replacing mono-films.

The packaging industries still represent a strong need for economical, effective and innovative packaging solutions.

Polymer film manufacturers therefore seek films which have excellent mechanical properties, e.g. high impact strength, tear strength, puncture resistance, toughness and stiffness. The polymers used to make the film must also have good processability, i.e. during the extrusion procedure the bubble formed must be stable and the extruded film should have an even film thickness distribution.

Unfortunately art skilled persons are faced with the problem that when improving one property it seems inevitable that another property is adversely affected.

For example, low density polyethylene (LDPE) gives rise to films having good optical properties and can be processed at low temperatures and pressures whilst maintaining melt strength and excellent processability however films made from LDPE contribute little to mechanical properties.

Conventional unimodal Ziegler-Natta produced linear low density polyethylenes (znLLDPE's) have moderate mechanical properties but not so remarkable processability, meaning both bubble stability and extrusion pressure.

Optical properties and puncture resistance have been improved by using metallocene linear low density polyethylenes but even more at the expense of processability. These polymers are sensitive for film processing conditions and lack melt strength.

Various blends of these materials have been proposed in the art to try to maximise film performance by combining the advantageous properties of certain polymers. Thus for example, LDPE and mLLDPE have been blended to form films however such films have poor stiffness. Medium density polyethylene made by metallocene catalysis has been blended with LDPE (EP-A-1108749) to form films.

A great variety of multilayer films have also been disclosed which should solve the above problems of non-satisfactory balance of mechanical properties, especially stiffness and toughness, and processability.

For example WO 2008/104371 discloses multilayer film laminate which comprises a multilayer film with, in the given layer order, an inner layer (A), a core layer (B) and an outer layer (C), which is laminated to a substrate.

The inner layer (A) comprises a multimodal polyethylene composition, i.e. a bimodal linear low density polyethylene (LLDPE), having a density of 940 kg/m$^3$ or less and molecular weight distribution Mw/Mn of at least 8 and a MFR2 of 0.01 to 20 g/10 min when determined according to ISO 1133 (at 190° C. and 2.16 kg load).

Preferably, the LLDPE comprises an ethylene hexene copolymer, ethylene octene copolymer or ethylene butene copolymer.

Layer (C) comprises LLDPE which can be unimodal or multimodal LLDPE. Moreover, the LLDPE can be znLLDPE or the LLDPE can be obtainable by polymerisation using a single site catalyst (mLLDPE). Both mLLDPE and znLLDPE alternatives are preferable. Also preferably, layer (C) may comprise low-density polyethylene (LDPE) homo- or copolymer composition obtainable by high-pressure polymerisation.

Layer (B) can comprise or consists of the same polymer composition as comprised or consisted of in layer (A) or layer (C).

Borstar® FB2310 or Borstar® FB2230 as commercial grades of LLDPE's are given as examples as feasible multimodal LLDPE grades for at least layer (A) and, if present, for optional layer(s), such as layer (B).

WO 2008/074493 discloses a uniaxially oriented multilayer film comprising at least a layer (A) and a layer (B), wherein said layer (A) comprises a linear low density polyethylene (LLDPE) comprising (e.g. selected from):
  a multimodal LLDPE produced using a Ziegler Natta catalyst (znLLDPE), or
  a LLDPE produced using a single site catalyst (mLLDPE) or
  a mixture of a mLLDPE and a multimodal znLLDPE, said layer (B) comprises a multimodal LLDPE, and said multilayer film is in the form of a stretched film which is uniaxially oriented in the machine direction (MD) in a draw ratio of at least 1:3.

Layer (A) of embodiment (i) may optionally comprise one or more additional polymer components other than LLDPE, such as a medium density polyethylene (MDPE), a high density polyethylene (HDPE), both produced in low pressure polymerisation, or a low density polyethylene (LDPE) produced in high pressure polymerisation, such as LDPE homopolymer or LDPE copolymer, such as ethylene acrylate copolymer.

In one particularly preferred embodiment (ii) of the invention, a layer (A) comprises, more preferably consists of, mLLDPE and LDPE.

Layer (B) preferably comprises at least 50 wt %, preferably at least 60 wt %, more preferably at least 70 wt % of a multimodal LLDPE. In some embodiments even about 80 wt % or more of multimodal LLDPE is preferred. Multimodal LLDPE is preferably a multimodal znLLDPE composition.

The film may further comprise (iii) a layer (C). Said layer (C), when present, preferably has a polymer composition as described in relation to layer (A) above.

The LLDPE used for layer (B), preferably a multimodal znLLDPE, preferably comprises an ethylene hexene copolymer, ethylene octene copolymer or ethylene butene copolymer.

WO 2006/037603 discloses a 3-layer structure, wherein the outer layers comprise LLDPE, preferably unimodal LLDPE, especially unimodal mLLDPE. The LLDPE is preferably a $C_2/C_6$-copolymer. One or both outer layers may contain LDPE.

It is further disclosed that a specific film may comprise a first outer layer comprising a unimodal LLDPE and LDPE blend with the other outer layer being formed from multimodal LLDPE optionally combined with an LDPE component.

The core layer comprises a multimodal polyethylene component having a lower molecular weight component and a higher molecular weight component, i.e. a multimodal LLDPE.

Thus, the multimodal PE comprises a higher molecular weight component which preferably corresponds to an ethylene copolymer and a lower molecular weight component which corresponds to an ethylene homopolymer or copolymer. Such 3-layer films are especially suitable for producing pouches.

However, although much development work has already been done in the field of multilayer films suitable for different kinds of packaging, the films as disclosed in the prior art still do not provide a sufficient mechanical properties, such as especially for example tear and/or DDI and/or creep, so that there exists a need for novel and improved film structures, providing films with excellent mechanical properties especially for example tear and/or DDI (on film and film folded) and/or creep, especially preferred for heavy duty shipping sack (HDSS) or form-fill-seal (FFS) bag applications.

SUMMARY OF THE INVENTION

It is an object of the present invention to provide a multilayer film which provides excellent mechanical properties especially for example tear and/or DDI and/or creep, especially preferred for heavy duty shipping sack (HDSS) or form-fill-seal (FFS) bag applications.

It has surprisingly been found that a multilayer film comprising three layers according to the invention can fulfil these requirements.

Thus the present invention provides a multilayer film, preferably for heavy duty shipping sacks, which comprises a core layer (C) and two outer layers (O-1, O-2) sandwiching the core layer, wherein
  (i) the core layer (C) comprises 90 to 100% by weight of a first bimodal ethylene/1-butene/$C_6$-$C_{12}$-alpha-olefin terpolymer having a density between >925 kg/m$^3$ and 970 kg/m$^3$ with respect to the total weight of the layer,
  (ii) two outer layers (O-1) and (O-2) comprise
  (ii-1) the bimodal terpolymer as defined for the core layer (C) and
  (ii-2) a second bimodal ethylene/1-butene/$C_6$-$C_{12}$-alpha-olefin terpolymer having a density between >910 and <925 kg/m$^3$.

DETAILED DESCRIPTION OF THE INVENTION

The multilayer film according to the present invention comprises two outer layers and a core layer, which is sandwiched between the two outer layers and is purely polyethylene based.
Core Layer The core layer (C) comprises a bimodal ethylene/1-butene/$C_6$-$C_{12}$-alpha-olefin terpolymer.

The polyethylene component in the core layer may preferably be bimodal, i.e. its molecular weight profile does not comprise a single peak but instead comprises the combination of two peaks (which may or may not be distinguishable) centred about different average molecular weights as a result of the fact that the polymer comprises two separately produced components.

Multimodal polyethylenes are typically made in more than one reactor each having different conditions. The components are typically so different that they show more than one peak or shoulder in the diagram usually given as result of its GPC (gel permeation chromatograph) curve, where d(log(MW)) is plotted as ordinate vs log(MW), where MW is molecular weight.

More preferably the polyethylene in the core layer may for example comprise or consist of formed from an ethylene homopolymer and an ethylene butene/hexene terpolymer or ethylene butene/octene terpolymer.

Such bimodal polymers may be prepared for example by two stage polymerisation or by the use of two different polymerisation catalysts in a one stage polymerisation. It is also possible to employ a dualsite catalyst. It is important to ensure that the higher and lower molecular weight components are intimately mixed prior to extrusion to form a film. This is most advantageously achieved by using a multistage process or a dual site but could be achieved through blending.

To maximise homogeneity, particularly when a blend is employed, it is preferred if the multimodal polyethylene used in the core layer is extruded prior to being extruded to form the film of the invention. This pre-extrusion step ensures that the higher molecular weight component will be homogeneously distributed though the core layer and minimises the possibility of gel formation in the film.

Preferably the multimodal polyethylene is produced in a multi-stage polymerisation using the same catalyst, e.g. a metallocene catalyst or preferably a Ziegler-Natta catalyst. Thus, two slurry reactors or two gas phase reactors could be employed. Preferably however, the multimodal polyethylene is made using a slurry polymerisation in a loop reactor followed by a gas phase polymerisation in a gas phase reactor.

A loop reactor—gas phase reactor system is marketed by Borealis A/S, Denmark as a BORSTAR reactor system. The multimodal polyethylene in the core layer is thus preferably formed in a two stage process comprising a first slurry loop polymerisation followed by gas phase polymerisation in the presence of a Ziegler-Natta catalyst.

The conditions used in such a process are well known. For slurry reactors, the reaction temperature will generally be in the range 60 to 110° C. (e.g. 85-110° C.), the reactor pressure will generally be in the range 5 to 80 bar (e.g. 50-65 bar), and the residence time will generally be in the range 0.3 to 5 hours (e.g. 0.5 to 2 hours). The diluent used will generally be an aliphatic hydrocarbon having a boiling point in the range −70 to +100° C. In such reactors, polymerisation may if desired be effected under supercritical conditions. Slurry polymerisation may also be carried out in bulk where the reaction medium is formed from the monomer being polymerised.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen or low boiling point hydrocarbons such as propane together with monomer (e.g. ethylene).

Preferably, the low molecular weight polymer fraction is produced in a continuously operating loop reactor where ethylene is polymerised in the presence of a polymerisation catalyst as stated above and a chain transfer agent such as hydrogen. The diluent is typically an inert aliphatic hydrocarbon, preferably isobutane or propane.

The high molecular weight component can then be formed in a gas phase reactor using the same catalyst.

Where the higher molecular weight component is made as a second step in a multistage polymerisation it is not possible to measure its properties directly. However, e.g. for the above described polymerisation process of the present invention, the density, $MFR_2$ etc of the HMW component can be calculated using Kim McAuley's equations.

Thus, both density and $MFR_2$ can be found using K. K. McAuley and J. F. McGregor: On-line Inference of Polymer Properties in an Industrial Polyethylene Reactor, AIChE Journal, June 1991, Vol. 37, No, 6, pages 825-835. The density is calculated from McAuley's equation 37, where final density and density after the first reactor is known. $MFR_2$ is calculated from McAuley's equation 25, where final $MFR_2$ and $MFR_2$ after the first reactor are calculated.

In one embodiment the multilayer film according to the invention, the core layer (C) may comprise a first bimodal ethylene/1-butene/$C_6$-$C_{12}$-alpha-olefin terpolymer, which can comprise
(A-1) a low molecular weight homopolymer of ethylene and
(A-2) a high molecular weight terpolymer of ethylene, 1-butene and a $C_6$-$C_{12}$-alpha-olefin.

In one embodiment the multilayer film according to the invention, the $C_6$-$C_{12}$-alpha-olefins may be selected from the group of 1-hexene, 4-methyl-1-pentene, 1-octene and 1-decene.

In one embodiment the multilayer film according to the invention, the first ethylene/1-butene/$C_6$-$C_{12}$-alpha-olefin terpolymer may comprise a low molecular weight fraction of a homopolymer of ethylene and a high molecular weight fraction of a terpolymer of ethylene, 1-butene and a $C_6$-$C_{12}$-alpha-olefin,
the bimodal terpolymer having a melt flow rate $MFR_{21}$ according to ISO 1133 (190° C.), preferably of 10 to 40 g/10 min, more preferably of 15 to 30 g/10 min and most preferably 17 to 27 g/10 min, a density according to ISO 1183, (method A) of 910 to 950 kg/m³, preferably of 925 to 937 kg/m³ and a comonomer content of 1 to 7% by mol, preferably 1.5 to 3.0% by mol, whereby
the low molecular weight fraction of the bimodal terpolymer has a melt index $MFR_2$ according to ISO 1133 (190° C.), of 200 to 800 g/10 min, preferably of 300 to 600 g/10 min, a density according to ISO 1183, (method A) of 940 to 980 kg/m³, preferably 945 to 975 kg/m³ and a comonomer content of 0 to 2.5% by mol, preferably 0 to 2% by mol, and the amount of the low molecular weight fraction in the bimodal terpolymer is in the range of 30 to 60 wt %, preferably 35 to 50 wt % and most preferably 35 to 45 wt %.

The expression "homopolymer of ethylene" used herein refers to a polyethylene that consists substantially, i. e. to at least 98% by weight, preferably at least 99% by weight, more preferably at least 99.5% by weight, most preferably at least 99.8% by weight of ethylene.

As stated above the higher alpha-olefin comonomers are preferably $C_6$-$C_{12}$-alpha-olefins selected from the group of 1-hexene, 4-methyl-1-pentene, 1-octene and 1-decene.

More preferably 1-hexene or 1-octene, most preferably 1-hexene is used as second comonomer beside 1-butene.

Thus suitable terpolymers can comprise a low molecular weight homopolymer of ethylene and a high molecular weight terpolymer of ethylene, 1-butene and a $C_6$-$C_{12}$-alpha-olefin.

The weight average molecular weight of the bimodal terpolymer may be for example between 100 000 to 500 000 g/mol, preferably 200 000 to 400 000 g/mol. The low molecular weight polymer fraction may have a weight average molecular weight preferably for example of 4 500 to 55 000 g/mol, more preferably of 5 000 to 50 000 g/mol and the high molecular weight polymer has a weight average molecular weight preferably of 200 000 to 1 000 000 g/mol, more preferably of 300 000 to 800 000 g/mol.

The first terpolymer may have a melt flow rate $MFR_{21}$, preferably of 2 to 35 g/10 min, more preferably of 10 to 30 g/10 min. The low molecular weight polymer has a melt index $MFR_2$ preferably of 300 to 1 200 g/10 min, more preferably of 300 to 600 g/10 min.

The density of the first terpolymer may be preferably between >925 and 970 kg/m³, more preferably between 927 and 939 kg/m³. The density of the low molecular weight polymer may be preferably of 970 to 980 kg/m³, more preferably of 972 to 978 kg/m³, most preferably 975 kg/m³.

The amount of the low molecular weight copolymer in the first terpolymer according is in the range of 30 to 60 wt %, more preferably 35 to 50 wt % and most preferably 38 to 45 wt %.

In one embodiment, the content of the first terpolymer in the core layer may preferably be >95 wt % and 100 wt %, further preferred between 97 wt % to 100 wt % based on the total weight of the core layer.

In addition to the terpolymers embodiments may also contain antioxidants, process stabilizers, pigments, UV-stabilizers and other additives known in the art. The core layer may also comprise other polymers. Preferably, the core layer according to the invention however does not comprise any further polymer besides the first terpolymer.

Examples of stabilizers are hindered phenols, hindered amines, phosphates, phosphites and phosphonites.

Examples of pigments are carbon black, ultra marine blue and titanium dioxide. Examples of other additives are e. g. clay, talc, calcium carbonate, calcium stearate, zinc stearate and antistatic additives like.

Sandwiching Layers

As identified above, the three-layer structure in accordance with the present invention comprises in addition to the core layer two outer layers sandwiching the core layer. The layers sandwiching the core layer are layers directly contacting the core layer, preferably without any adhesive layer or surface treatment applied.

Outer layers in the sense of the invention may thereby be two layers sandwiching one core layer regardless of any or both of them being (an) outermost layer. In an embodiment of the invention the outer layers may however be the outermost layers.

The two outer layers which are sandwiching the core layer can comprise
(ii-1) a first bimodal terpolymer with an $MFR_2$ according to ISO 1133 (190° C.) of 0.1 to 5 g/10 min, preferably of 0.2 to 3 g/10 min, and more preferably of 0.5 to 1.2 g/10 min.

In one embodiment of a multilayer film according to the invention, the outer layers (O-1) and (O-2) may comprise (ii-1) a first bimodal terpolymer with a density according to ISO 1183, (method A) between >925 and 970 kg/m³, more preferably between 927 and 939 kg/m³.

In one embodiment of a multilayer film according to the invention, the outer layers (O-1) and (O-2) may comprises (ii-2) a second bimodal terpolymer with an $MFR_2$ according to ISO 1133 (190° C.) of 0.7 to 6 g/10 min, preferably of 1 to 3 g/10 min, and more preferably of >1.2 to 2 g/10 min.

In one embodiment of a multilayer film according to the invention the outer layers (O-1) and (O-2) may comprise (ii-2) a second bimodal terpolymer with a density according to ISO 1183, (method A) of 912 to 923 kg/m³, preferably 915 to 922 kg/m³

In one embodiment of a multilayer film according to the invention, the outer layers (O-1) and (O-2) comprises a blend of first bimodal terpolymer and a second bimodal terpolymer, whereby the amount of first bimodal terpolymer may be in the range of 1 to 50 wt %, preferably in the range of 20 to 40 wt %, and the amount of second bimodal terpolymer is in the range of >50 to 99 wt %, preferably 60 to 80 wt %.

In one embodiment of a multilayer film according to the invention, the outer layers (O-1) and (O-2) may be the same.

The outer layers may also contain other polymer components if necessary and may also contain minor amounts of conventional additives such as antioxidants, UV stabilisers, acid scavengers, nucleating agents, anti-blocking agents, slip agents etc as well as polymer processing agent (PPA). Polymer processing agents are available from commercial suppliers such as Dynamar and may include a fluoroelastomer component and can be added to the outer layer blend as part of a masterbatch as is known in the art.

Three-Layer Structure

The films of the invention may have a thickness of 10 to 250 microns, preferably 20 to 200 microns, and more preferably 30 to 150 microns.

The outer layers and core layer may all be of equal thickness or alternatively the core layer may be thicker than each outer layer. A convenient film comprises two outer layers which each form 10 to 35%, preferably 15 to 30% of the total thickness of the 3-layered film, the core layer forming the remaining thickness, e.g. 30 to 80%, preferably 40 to 70% of the total thickness of the 3-layered film.

The three-layer structure in accordance with the present invention may be prepared by any conventional film extrusion procedure known in the art including cast film and blown film extrusion. Preferably, the three-layer film is formed by blown film extrusion, more preferably by coextrusion processes, which in principle are known and available to the skilled person.

Typical processes for preparing a three-layer structure in accordance with the present invention are extrusion processes through an angular die, followed by blowing into a tubular film by forming a bubble which is collapsed between the rollers after solidification. This film can then be slid, cut or converted, such as by using a gazette head, as desired. Conventional film production techniques may be used in this regard. Typically the core layer mixture and the mixture for the sandwiching layers are coextruded at a temperature in the range of from 160 to 240° C. and cooled by blowing gas (generally air) at a temperature of 10 to 50° C., to provide a frost line height of for example 1 or 2 to 8 times the diameter of the dye. The blow up ratio should generally be in the range of from 1.5 to 4, such as from 1.7 to 4, preferably 2 to 3.

If desired any of the three layers of the three-layered structure of the invention may comprise usual additives, such as stabilizers, processing aids, colorants, anti-block agents, slip agents etc. in amounts not detrimental to the desired function of the three-layered structure. Typically the overall amount of additives in a layer is >0 wt % to 7 wt % based on the weight of the layer, preferably 0.01 wt % to 5 wt %, more preferably 0.1 wt % ti 3 wt %. In embodiments the layers can be completely free of any additives.

The three-layer structure as identified in the present invention surprisingly displays an excellent mechanical properties, especially for example DDI and/or tear.

The three-layer structure as identified in the present invention especially exhibits high impact strengths in a broad temperature range.

Thus for a 100 micron three layer film of the invention, DDI may be between 500 g and 750 g, preferably 550 g and 675 g and/or relative tear resistance may be between 45 and 100 N/mm, preferably 50 to 90 N/mm in MD.

The films of the invention have a wide variety of applications but are of particular interest in packaging, especially for heavy duty shipping sack (HDSS) and/or form-fill-seal (FFS) bag applications.

For such packaging purposes, the three-layer structure in accordance with the present invention may be laminated with additional films, including resin films, metal foils etc., depending upon the desired end application.

The additional optional layers are naturally selected so that they have no adverse effect on the inventive effect achieved with the three-layer structure according to the invention. Thus it is also possible to use the three-layer structure of the present invention for producing a 5- or even 7-layered film, depending upon the desired end application.

However, the three-layer structure in accordance with the present invention preferably is employed as such, without lamination to any further film material.

Due to these novel and unique properties of the three-layer films of the invention these structures offer excellent advantages for packaging, preferably flexible packaging, especially for heavy duty shipping sack (HDSS) and/or form-fill-seal (FFS) bag applications.

Thus the three-layer structure according to the present invention is suitable for flexible packaging.

The actual packaging process may be a form, fill and seal (FFS) process, deep draw process or tray lidding process. FFS and deep draw processes are preferred.

FFS involves packaging machines that use heat sealable flexible plastic packaging film to form a package, which is then filled, heat-sealed and cut off. There are two basic types, horizontal and vertical. A horizontal machine forms a package, fills with product and seals, and all in a sequence of operations while the film is being transported in a horizontal direction. They are widely used for packaging solid foodstuffs. A vertical machine forms a tube, fills and seals, all in a sequence of operations while the film is being transported vertically downwards. They are widely used for packaging for example foodstuffs in a liquid, powder, and paste or granule state.

The present invention thereby also concerns the use of a film according to the invention for heavy duty shipping sack (HDSS) and/or form-fill-seal (FFS) bag applications.

Experimental Part

1. Methods

The following methods were used to measure the properties that are defined generally above and in examples below. Unless otherwise stated, the film samples used for the measurements and definitions were prepared as described under the heading "Film Sample Preparation".

Impact resistance on film (DDI) is determined by Dart-drop (g/50%). Dart-drop is measured using ISO 7765-1, method "A". A dart with a 38 mm diameter hemispherical head is dropped from a height of 0.66 m onto a film clamped over a hole. If the specimen fails, the weight of the dart is reduced and if it does not fail the weight is increased. At least 20 specimens are tested. The weight resulting in failure of 50% of the specimens is calculated. The values reported on film folded reported in Table 2 below are measured in the same way but with the film specimen folded and unfolded again before measuring, so as to recreate the weakening/stress that may occur by folding before measuring.

Relative Tear Resistance (Determined by Elmendori Tear (N/Mm))

The tear strength or tear resistance is measured using the ISO 6383/2 method. The force required to propagate tearing across a film specimen is measured using a pendulum device. The pendulum swings under gravity through an arc, tearing the specimen from a pre-cut slit. The specimen is fixed on one side by the pendulum and on the other side by a stationary clamp. The tear strength or tear resistance is the force required to tear the specimen. The relative tear resistance (N/mm) can be calculated by dividing the tear resistance by the thickness of the film. The films were produced as described below in the film preparation example. The tear strength or tear resistance is measured in machine direction (MD) and/or transverse direction (TD).

Tensile Modulus (E-Mod (MPa) was Measured in Machine and/or Transverse Direction $MFR_2$: ISO1133 at 190° C. at a load of 2.16 kg
$MFR_5$: ISO1133 at 190° C. at a load of 5 kg
$MFR_{21}$: ISO1133 at 190° C. at a load of 21.6 kg Density of the materials is measured according to ISO 1183-1(2004): method A. The test specimens were produced according to ISO 1872-2. The cooling rate of the plaques when crystallising the samples was 15 C/min. Conditioning time was 16 hours at 23° C.

Molecular Weights, Molecular Weight Distribution, Mn, Mw, MWD

Mw/Mn/MWD were measured by GPC according to the following method:

The weight average molecular weight Mw and the molecular weight distribution (MWD=Mw/Mn wherein Mn is the number average molecular weight and Mw is the weight average molecular weight) are measured by a method based on ISO 16014-4:2003. A Waters 150CV plus instrument was used with 3×HT&E styragel column from Waters (divinylbenzene) and trichlorobenzene (TCB) as solvent at 140° C. The column set was calibrated using universal calibration with narrow MWD PS standards (the Mark Howinks constant K: 9.54*10-5 and a: 0.725 for PS, and K: 3.92*10-4 and a: 0.725 for PE). Equipment: Alliance 2000 GPCV (VV4410), detector: Refractive index and Visc-detector.

Creep MD

During a tensile creep test a specimen has been applied by a static, constant load. Thereby the nominal tensile creep strain (in %), produced by the exerted load at any given time during the test, is determined. The results of tensile creep test can be used to estimate the deformation and strength behavior of films, that are exposed to in practice long-term acting, universal tensile loads. The increase in elongation is determined by an ultrasonic sensor, which measures the change in length continuously. Creep strain is measured here on the produced films in machine direction (MD) for 2.3 kg load at 23° C. after 24 h and 50% humidity as well as otherwise according to ISO 899-1. Values are reported in Table 2%.

Density, Co-Monomer Content and Thickness

Density can be determined according to any suitable method well known in the art to do so, such as for example the method according to ISO 1183-2/1872-2B. Co-monomer content can be determined according to any suitable method well known in the art to do so, such as for example NMR. Film thickness can be determined according to any suitable method well known in the art to do so, such as for example any suitable measuring device.

The following examples illustrate the present invention.

2. Examples

The following film structures have been prepared:

TABLE 1

| | \multicolumn{4}{c}{Layered structures of films} | | | |
|---|---|---|---|---|
| | IE1 | CE1 | CE2 | CE3 |
| Structure | 3-layer | 3-layer | 3-layer | 1-layer |
| Layered structure | 20/20/20/20/20 | 20/20/20/20/20 | 20/20/20/20/20 | 20/20/20/20/20 |
| Two skin layers | FX1001/FK1820 30/70 | FX1001/FK1820 30/70 | FB1520/FK1820 30/70 | — |
| Core layer | FX1001 | FB1520/FX1001 30/70 | FB1520/FX1001 60/40 | FK1820 |
| Final film thickness, μm | 100 | 100 | 100 | 100 |

(30/70 or the like means the weight percentage of each material in the respective layer)

The layered structure indicated above means that each of five layers contributes to 20% of the film thickness. The core layer is however composed of three layers each (triple the thickness of each skin layer), so that the result is a three layer structure.

Materials used:

Borshape™ FX1001 is a bimodal ethylene/1-butene/$C_6$-$C_{12}$-alpha-olefin terpolymer according to the present invention with a density of 931 kg/m³ and an $MFR_2$ of 0.9 g/10 min commercially available from Borealis.

Anteo™ FK1820 is a bimodal LLDPE, especially an ethylene/1-butene/$C_6$-$C_{12}$-alpha-olefin terpolymer according to the present invention with a density of 918 kg/m³ and an $MFR_2$ of 1.5 g/10 min commercially available from Borealis.

Borstar® FB1520 is a high density polyethylene with a density of 952 kg/m³ and an $MFR_2$ of <0.1 g/10 min also available coercially from Borealis.

Film Sample Preparation

Film Samples were produced by coextrusion on a 5-layer Alpine Hosoka coextrusion blown film line with die diameter 180 mm, frost line height of about 1400 mm, at a blow up ratio (BUR) 1:2 and die gap 1.5 mm.

Extruder temp setting: 200-210° C. for the core layer and 200-215° C. for the skin layers. Output was about 270 kg/h.

TABLE 2

| Mechanical properties of the films | | | | |
|---|---|---|---|---|
| Mechanical properties | IE1 | CE1 | CE2 | CE3 |
| Relative Tear Resistance MD, N/mm | 68.1 | 38.6 | 26.6 | — |
| Dart Drop Impact (film), g | 630 | 473 | 287 | — |
| Creep MD (2.3 kg, 23° C., 24 h, 50% humidity), % | 44 | 28 | 17 | 284 |
| Dart Drop Impact (film folded), g | 544 | 303 | 121 | — |

One can clearly see from the results above that tear, DDI (on film and on film folded) may be surprisingly improved for the inventive example over the comparative examples. At the same time creep is maintained at a satisfactory level, especially compared to CE3. The balance of tear, DDI, especially also on film folded, and creep is thereby for example particularly important for heavy duty shipping sack applications.

The invention claimed is:

1. A multilayer film comprising a core layer (C) and two outer layers (O-1, O-2) sandwiching the core layer, wherein
    (i) the core layer (C) comprises from 90 to 100% by weight of a first bimodal ethylene/1-butene/$C_6$-$C_{12}$-alpha-olefin terpolymer having a density between >925 kg/m³ and 970 kg/m³ with respect to the total weight of the layer,
    (ii) the two outer layers (O-1) and (O-2) each comprise a blend of
    (ii-1) the first bimodal terpolymer as defined for the core layer (C) and
    (ii-2) a second bimodal ethylene/1-butene/$C_6$-$C_{12}$-alpha-olefin terpolymer having a density between >910 kg/m³ and <925 kg/m³.

2. The multilayer film according to claim 1, wherein the first bimodal ethylene/1-butene/$C_6$-$C_{12}$-alpha-olefin terpolymer of the core layer comprises
    (A-1) a low molecular weight homopolymer of ethylene and
    (A-2) a high molecular weight terpolymer of ethylene, 1-butene, and a $C_6$-$C_{12}$-alpha-olefin.

3. The multilayer film according to claim 2, wherein the first bimodal ethylene/1-butene/$C_6$-$C_{12}$-alpha-olefin terpolymer comprises a low molecular weight fraction of a homopolymer of ethylene and a high molecular weight fraction of a terpolymer of ethylene, 1-butene, and a $C_6$-$C_{12}$-alpha-olefin,
    wherein the first bimodal terpolymer has a melt flow rate $MFR_{21}$ according to ISO 1133 (190° C.) of 10 to 40 g/10 min, a density according to ISO 1183, (method A) of 910 to 950 kg/m³, and a comonomer content of 1 to 7% by mol whereby
    the low molecular weight fraction of the first bimodal terpolymer has a melt index $MFR_2$ according to ISO 1133 (190° C.) of 200 to 800 g/10 min, a density according to ISO 1183, (method A) of 940 to 980 kg/m³, and a comonomer content of 0 to 2.5% by mol, and the amount of the low molecular weight fraction in the bimodal terpolymer is in the range of 30 to 60 wt %.

4. The multilayer film according to claim 3, wherein the first bimodal terpolymer has a melt flow rate $MFR_{21}$ according to ISO 1133 (190° C.) of 15 to 30 g/10 min and/or a density according to ISO 1183, (method A) of 925 to 937 kg/m³ and/or a comonomer content of 1.5 to 3.0% by mol.

5. The multilayer according to claim 3, wherein the low molecular weight fraction of the first bimodal terpolymer has a melt index $MFR_2$ according to ISO 1133 (190° C.) of 300 to 600 g/10 min and/or a density according to ISO 1183, (method A) of 945 to 975 kg/m³ and/or a comonomer content of 0 to 2% by mol and/or the amount of the low molecular weight fraction in the first bimodal terpolymer is in the range of 35 to 50 wt %.

6. The multilayer film according to claim 1, wherein the $C_6$-$C_{12}$ alpha-olefins of the first and second bimodal ethylene/1-butene/$C_6$-$C_{12}$-alpha-olefin terpolymer are selected from the group of 1-hexene, 4-methyl-1-pentene, 1-octene, and 1-decene.

7. The multilayer film according to claim 1, wherein the first bimodal terpolymer (ii-1) of the outer layers (O-1) and (O-2) has with an $MFR_2$ according to ISO 1133 (190° C.) of 0.1 to 5 g/10 min.

8. The multilayer film according to claim 7, wherein the first bimodal terpolymer of the outer layers (O-1) and (O-2) has an $MFR_2$ according to ISO 1133 (190° C.) of 0.2 to 3 g/10 min.

9. The multilayer film according to claim 1, wherein the first bimodal terpolymer (ii-1) of the outer layers (O-1) and (O-2) has a density according to ISO 1183, (method A) of >925 to 970 kg/m³.

10. The multilayer film according to claim 9, wherein the first bimodal terpolymer of the outer layers (O-1) and (O-2) has a density according to ISO 1183, (method A) of 927 to 939 kg/m³.

11. The multilayer film according to claim 1, wherein the second bimodal terpolymer (ii-2) of the outer layers (O-1) and (O-2) has an $MFR_2$ according to ISO 1133 (190° C.) of 0.7 to 6 g/10 min.

12. The multilayer according to claim 11, wherein the second bimodal terpolymer of the outer layers (O-1) and (O-2) has an $MFR_2$ according to ISO 1133 (190° C.) of 1 to 3 g/10 min.

13. The multilayer film according to claim 1, the second bimodal terpolymer (ii-2) of the outer layer (O-1) and (O-2) has a density according to ISO 1183, (method A) of 921 to 923 kg/m³.

14. The multilayer according claim 13, wherein the second bimodal terpolymer of the outer layers (O-1) and (O-2) has a density according to ISO 1183, (method A) of 915 to 922 kg/m³.

15. The multilayer film according to claim 1, wherein each blend of the outer layers (O-1) and (O-2) comprise 1 to 50 wt % of the first bimodal terpolymer and >50 to 99 wt % of the second bimodal terpolymer.

16. The multilayer film according to claim 15, wherein each blend of the outer layers (O-1) and (O-2) comprises 20 to 40 wt % of the first bimodal terpolymer and 60 to 80 wt % of the second bimodal terpolymer.

17. The multilayer film according to claim 1, wherein the outer layers (O-1) and (O-2) may be the same.

18. The multilayer film according to claim 1, having a thickness of to 250 microns whereby the outer layers and core layer may all be of equal thickness or alternatively each outer layer forms 10 to 35% of the total thickness of the multilayered film and the core layer forms 30 to 80% of the total thickness of the multilayered film.

19. The multilayer according to claim 18, having a thickness of 20 to 200 microns and/or each outer layer forms 15 to 30% of the total thickness of the multilayered film and/or the core layer forms 40 to 70% of the total thickness of the multilayered film.

20. A heavy duty shipping sack and/or or form-fill-seal bag comprising the multilayer film of claim 1.

\* \* \* \* \*